US006278905B1

(12) United States Patent
Saito

(10) Patent No.: US 6,278,905 B1
(45) Date of Patent: Aug. 21, 2001

(54) METHOD AND SYSTEM FOR CONTROLLING ROBOT ARMS OF AUTOMATIC GUIDED VEHICLES ON SEMICONDUCTOR WAFER PRODUCTION LINE

(75) Inventor: Daisuke Saito, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/238,409

(22) Filed: Jan. 28, 1999

(30) Foreign Application Priority Data

Jan. 28, 1998 (JP) .................................................. 10-015699

(51) Int. Cl.[7] .......................... G05B 19/04; G05B 19/418
(52) U.S. Cl. .......................... 700/247; 700/218; 700/215; 700/213; 700/222; 700/230; 701/23; 701/24; 701/25; 701/117; 414/808; 414/800; 414/277; 340/460
(58) Field of Search .................................... 704/247, 218, 704/213, 215, 222, 230; 701/23, 24, 25, 117; 104/88.1, 288, 292, 88.02; 901/31, 37, 7; 318/587; 414/808, 800, 277, 602; 340/460, 461

(56) References Cited

U.S. PATENT DOCUMENTS

| 5,075,853 | * | 12/1991 | Luke, Jr. | ................................. | 701/25 |
| 5,239,739 | * | 8/1993 | Akeel et al. | .............................. | 29/430 |
| 5,545,967 | * | 8/1996 | Osborne et al. | ....................... | 320/109 |
| 5,885,138 | * | 3/1999 | Okumura et al. | ........................ | 451/67 |
| 5,896,297 | * | 3/1999 | Valerino, Sr. | ........................... | 700/213 |
| 6,129,025 | * | 10/2000 | Minakami et al. | ................ | 104/88.01 |
| 6,173,212 | * | 1/2001 | Valerino, Sr. | .......................... | 700/218 |

FOREIGN PATENT DOCUMENTS

| 60-238911 | 11/1985 | (JP) . |
| 61-30388 | 2/1986 | (JP) . |
| 62-191904 | 8/1987 | (JP) . |
| 62-264883 | 11/1987 | (JP) . |
| 63-120088 | 5/1988 | (JP) . |
| 4-23010 | 1/1992 | (JP) . |
| 4-48304 | 2/1992 | (JP) . |

OTHER PUBLICATIONS

Singh et al., Motion Planning and Dynamic Control of a Linked Manipulator unis Modified Magnetic Fields, 1997, IEEE, pp. 9–15.*
Kosuge et al., Motion Control of a Robot Arm Using Joint Torque Sensors, 1990, IEEE, pp. 258–263.*

* cited by examiner

Primary Examiner—William A. Cuchlinski, Jr.
Assistant Examiner—McDieunel Marc
(74) Attorney, Agent, or Firm—Young & Thompson

(57) ABSTRACT

A method of teaching a plurality of automatic guided vehicles, each of which is provided with at least a robot arm for loading and unloading an article, having the steps of: teaching an original one of the automatic guided vehicles both about reference-positional data by use of a single unpractical reference station and about practical-positional data belonging to at least a practical station by use of the at least practical station; and both supplying the automatic guided vehicles, except for the original one, with common data identical with the practical-positional data taught to the original one, and further teaching the automatic guided vehicles, except for the original one, about individual positional-compensating data by use of the single unpractical reference station so as to individually compensate the common data with the individual positional-compensating data for compensation to individual instrumental errors of the automatic guided vehicles. The positional-compensating data are concerned with a difference of each of the at least remaining one from the original one in a relative-position between a hand of the robot arm and a reference point on the automatic guided vehicle to be referred for stopping the automatic guided vehicle at a predetermined stop position in front of the at least practical station.

30 Claims, 2 Drawing Sheets

METHOD AND SYSTEM FOR CONTROLLING ROBOT ARMS OF AUTOMATIC GUIDED VEHICLES ON SEMICONDUCTOR WAFER PRODUCTION LINE

BACKGROUND OF THE INVENTION

The present invention relates to a method and a system for controlling robot arms of automatic guided vehicles on a semiconductor wafer production line, wherein the individual automatic guided vehicles perform accurate operations of loading and unloading a semiconductor wafer carrier onto and from predetermined placement positions of plural stations possessed by manufacturing equipment and automatic wafer stack on the semiconductor wafer production line.

The individual automatic guided vehicle is computer-controlled to stop in front of loading-purpose or unloading purpose station of the manufacturing equipment or loading/unloading-purpose station of the automatic wafer stack for subsequent operations of the robot arm provided on the automatic guided vehicle under computer-control for loading and unloading the wafer carrier onto and from the stations.

Actually, however, any trouble may accidentally appear on the automatic guided vehicle with the robot arm. In this case, it is of course necessary replace the troubled one of the practically working automatic guided vehicles by a stand-by automatic guided vehicle. Alternatively, any periodic inspection to the practically working automatic guided vehicles is necessarily needed. In this case, it is also needed to replace the practically working automatic guided vehicles by reserved stand-by automatic guided vehicles. In this case, it is proposed to teach the stand-by automatic guided vehicle, about stop-position and relative-positional data before entry into the practical orbit for practical operations of loading and unloading the wafer carrier onto and from the stations. This technique is, for example, disclosed in Japanese laid-open patent publications Nos. 60-238911 and 62-191904. The provisional teaching to the stand-by automatic guided vehicle about the stop-position and relative-positional data is preferably carried out before entry into the practical orbit for practical operations of loading and unloading the wafer carrier onto and from the stations. It has been known in the art in the field of computer-control of mechanical robots. The teaching may be carried out under the same conditions as the practically working conditions. This technique is, for example, disclosed in Japanese laid-open patent publications Nos. 62-264883 and 61-30388. Further, it was proposed to compensate the displacement in the relative position between the robot and the work station before the high accurate working operation of the robot is started. This technique is also disclosed in Japanese laid-open patient publication No. 4-48304.

In view of realizing higher accurate or exactly accurate loading and unloading operations of the robot arm of the automatic guided vehicle, it is essential to solve the problem with instrumental errors necessarily and unavoidably caused in assembling the individual automatic guided vehicles provided with the robot arms. Those instrumental errors are different between individual automatic guided vehicles provided with the robot arms. For obtaining the higher accurate or exactly accurate loading and unloading operations of the robot arm of the automatic guided vehicle, the instrumental error is influence on a relative position between the hand of the robot arm and a reference point on the automatic guided vehicle to be referred for stopping the automatic guided vehicle at a predetermined stop position in front of the at least practical station. The above prior arts along or in combination could never reach any settlement for individually and exactly compensation to variable differences in individually different instrumental errors between the automatic guided vehicles.

In the above circumstances, it had been required to develop a novel method or system of realizing highly and exactly accurate operations of loading and unloading the wafer carrier onto and from stations freely from the individually different instrumental errors of the automatic guided vehicles provided with the robot arms.

SUMMARY OF THE INVENTION

Accordingly, it is an object of the present invention to provide a novel method of realizing highly and exactly accurate operations of loading and unloading the wafer carrier onto and from stations free from the above problems.

It is a further object of the present invention to provide a novel method of realizing highly and exactly accurate operations of loading and unloading the wafer carrier onto and from stations freely from the individually different instrumental errors of the automatic guided vehicles provided with the robot arms.

It is a still further object of the present invention to provide a novel system of realizing highly and exactly accurate operations of loading and unloading the wafer carrier onto and from stations free from the above problems.

It is yet a further object of the present invention to provide a novel system of realizing highly and exactly accurate operations of loading and unloading the wafer carrier onto and from stations freely from the individually different instrumental errors of the automatic guided vehicles provided with the robot arms.

The first present invention provides a method of teaching a plurality of automatic guided vehicles, each of which is provided with at least a robot arm for loading and unloading an article. The method comprises the steps of: teaching an original one of the automatic guided vehicles both about reference-positional data by use of a single unpractical reference station and about practical-positional data belonging to at least a practical station by use of the at least practical station; and both supplying the automatic guided vehicles, except for the original one, with common data identical with the practical-positional data taught to the original one, and further teaching the automatic guided vehicles, except for the original one, about individual positional-compensating data by use of the single unpractical reference station so as to individually compensate the common data with the individual positional-compensating data for compensation to individual instrumental errors of the automatic guided vehicles. The positional-compensating data are concerned with a difference of each of the at least remaining one from the original one in a relative-position between a hand of the robot arm and a reference point on the automatic guided vehicle to be referred for stopping the automatic guided vehicle at a predetermined stop position in front of the at least practical station.

The second present invention provides a method of compensating individual instrument errors possessed by a plurality of automatic guided vehicles, each of which is provided with at least a robot arm for loading and unloading an article. The method comprises the single step: teaching each of the automatic guided vehicles about individual positional-compensating data by use of a single unpractical reference station so as to individually compensate commonly supplied practical-positional data of at least a practical station with the individual positional-compensating data for compensation to the individual instrumental errors of the automatic guided vehicles, wherein the positional-compensating data are concerned with a difference between the individuals of the automatic guided vehicles in a relative-position between a hand of the robot arm and a reference point on the automatic guided vehicle to be referred for stopping the automatic guided vehicle at a predetermined stop position.

The third present invention provides a method of controlling a plurality of automatic guided vehicles, each of which is provided with at least a robot arm for loading and unloading an article. The method comprises the steps of: teaching each of at least a stand-by one on a stand-by orbit of the automatic guided vehicles about positional-compensating data by use of a single unpractical reference station so as to individually compensate commonly supplied practical-positional data belonging to each of plural practical stations with the positional-compensating data to obtain individual compensated positional-data for compensation to the individual instrumental errors of the automatic guided vehicles, so that the robot arms of the automatic guided vehicles are controlled on the basis of the individual compensated positional-data for loading and unloading operations in front of practical stations, wherein the positional-compensating data are concerned with a difference between individuals of the automatic guided vehicles in a relative position between a hand of the robot arm and a reference point on the automatic guided vehicle to be referred to stopping the automatic guided vehicle at a predetermined stop position.

The fourth present invention provides a system for teaching a plurality of automatic guided vehicles, each of which is provided with at least a robot arm for loading and unloading an article onto and from at least a practical station. The system comprises an information storage device for storing common data informations obtained by teaching only an original one of the automatic guided vehicles about practical-positional data belonging to at least a practical station by use of the at least practical station; an information supplying device for supplying all of the automatic guided vehicles, except for the original one, with the common data informations about the practical-positional data; a teaching-purpose reference device for teaching everyone of the automatic guided vehicles about individual reference-positional data to obtain individual positional-compensating data, so as to individually compensate the practical-positional data as common data with the individual positional-compensating data for compensation to individual instrumental errors of the automatic guided vehicles. The positional-compensating data are concerned with a difference of the automatic guided vehicles, except for the original one, from the original one in a relative-position between a hand of the robot arm and a reference point on the automatic guided vehicle to be referred for stopping the automatic guided vehicle at a predetermined stop position in front of the at least practical station.

The fifth present invention provides an apparatus for compensating individual instrument errors possessed by a plurality of automatic guided vehicles, each of which is provided with at least a robot arm for loading and unloading an article. The apparatus comprises: a single unpractical reference station placed on an unpractical orbit different from a practical orbit on which the automatic guided vehicles perform practical loading and unloading operations, and the single unpractical reference station being for teaching each of the automatic guided vehicles about individual positional-compensating data, so as to individually compensate commonly supplied practical-positional data of at least a practical station with the individual positional-compensating data for compensation to the individual instrumental errors of the automatic guided vehicles, wherein the positional-compensating data are concerned with a difference between individuals of the automatic guided vehicles in a relative-position between a hand of the robot arm and a reference point on the automatic guided vehicle to be referred for stopping the automatic guided vehicle at a predetermined stop position.

The sixth present invention provides a system for controlling a plurality of automatic guided vehicles, each of which is provided with at least a robot arm for loading and unloading an article. The system comprises: a single unpractical reference station for teaching each of at least a stand-by one on a stand-by orbit of the automatic guided vehicles about positional-compensating data so as to individually compensate commonly supplied practical-positional data belonging to each of plural practical stations with the positional-compensating data to obtain individual compensated positional-data for compensation to the individual instrumental errors of the automatic guided vehicles; and a controller for controlling the robot arms of the automatic guided vehicles on the basis of the individual compensated positional-data for loading and unloading operations in front of practical stations, wherein the positional-compensating data are concerned with a difference between individuals of the automatic guided vehicles in a relative-position between a hand of the robot arm and a reference point on the automatic guided vehicle to be referred for stopping the automatic guide vehicle at a predetermined stop position.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
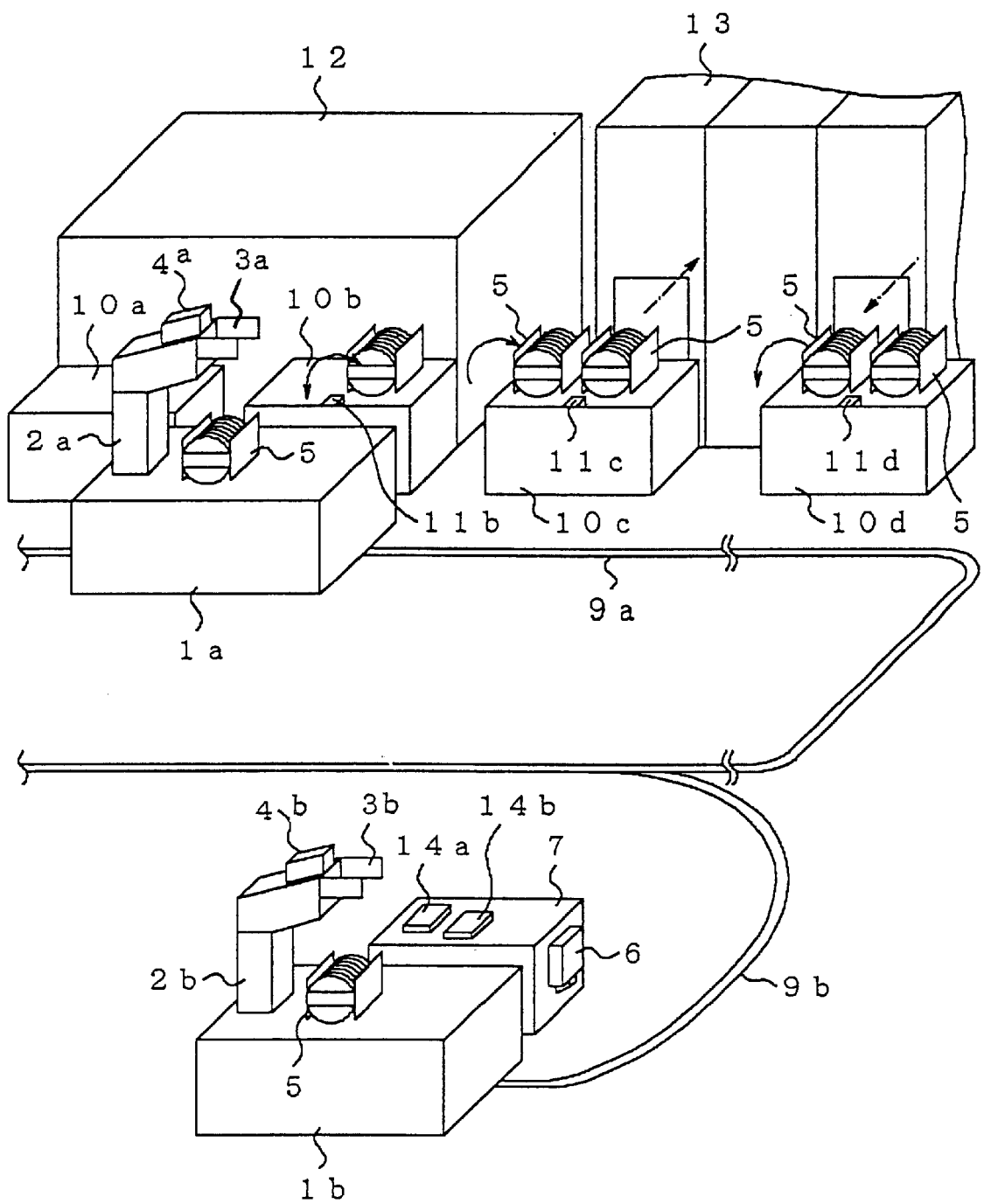
FIG. 1 is a schematic perspective view illustrative of a novel production line on which automatic guided vehicles with robot arms are operated to load and unload wafer carriers onto and from stations of both a manufacturing equipment and an automatic stack as well as a single reference station for teaching a stand-by automatic guided vehicle about individually compensated positional-data in a preferred embodiment in accordance with the present invention.

The first present invention provides a method of teaching a plurality of automatic guided vehicles, each of which is provided with at least a robot arm for loading and unloading an article. The method comprises the steps of: teaching an original one of the automatic guided vehicles both about reference-positional data by the use of a single unpractical reference station and about practical-positional data belonging to at least a practical station by use of the at least practical station; and both supplying the automatic guided vehicles, except for the original one, with common data identical with the practical-positional data taught to the original one, and further teaching the automatic guided vehicles, except for the original one, about individual positional-compensating data by use of the single unpractical reference station so as to individually compensate the common data with the individual positional-compensating data for compensation to individual instrumental errors of the automatic guided vehicles. The positional-compensating data are concerned with a difference of each of the at least remaining one from the original one in a relative-position between a hand of the robot arm and a reference point on the automatic guided vehicle to be referred for stopping the automatic guided vehicle at a predetermined stop position in front of the at least practical station.

In accordance with the first present invention, the robot arm of the original one of the automatic guided vehicles enables to perform at least any one of loading and unloading operations on the basis of the practical-positional data obtained by original teaching operation by use of the practical stations. The robot arm of the each of the automatic guided vehicles except for the original one enables to perform at least any one of the loading and unloading operations on the basis of the individual positional-compensating data. It is necessary to teach but only the original one of the automatic guided vehicles about the practical-positional data belonging to the practical stations by use of the practical stations. It is, however, unnecessary to teach the remainders of the automatic guided vehicles about the practical-positional data belonging to the practical stations by use of the practical stations, whereby there can be shortened the necessary time for teaching all of the automatic guided vehicles. The above present invention is to teach all of the automatic guided vehicles about practically usable and individually compensated positional data which were individually compensated with the above positional-compensating data obtained by reference-teaching operation by use of the single unpractical reference station, resulting in the exact compensation to individual instrumental errors of the automatic guided vehicles, thereby performing the exactly accurate loading and unloading operations of the robot arms of everyone of the automatic guided vehicles. The above instrumental errors are necessarily and unavoidably caused in assembling the individual automatic guided vehicles. In accordance with the present invention, however, it is possible to teach all of the automatic guided vehicles about practically usable and individually compensated positional data which were individually compensated with the above positional-compensating data obtained by reference-teaching operation by use of the single unpractical reference station for the purpose of the exact compensation to the individual instrumental errors of the automatic guided vehicles, thereby permitting the robot arms of everyone of the automatic guided vehicles to exhibit the exactly accurate loading and unloading operations.

Further, the above teaching to all of the automatic guided vehicles, except for the original one, about the positional-compensating data for compensation to the previously supplied common practical positional data to obtain the required practically usable and individually compensated positional data is carried out on the unpractical orbit by use of the single unpractical reference station along the unpractical orbit whilst the practically working automatic guided vehicles are continued on the practical orbit for practically loading and unloading the articles onto and from the practical stations. The above reference-teaching to obtain the required practically usable and individually compensated positional data already compensated with the positional-compensating data has been carried out, before the automatic guided vehicles possessing the required practically usable and individually compensated positional data are placed on the unpractical orbit in the stand-by state to wait for a possible future calling to enter into the practical orbit. If any trouble appears on any one of the practically working automatic guided vehicles, then the stand-by automatic guided vehicle possessing the required practically usable and individually compensated positional data enters into the practical orbit for practical working for loading and unloading the article onto and from the practical stations in place of the troubled one of the practically working automatic guided vehicles. The troubled one of the practically working automatic guided vehicles is thus retired from the practical orbit to hand over the practical loading and unloading works to the newly entered automatic guided vehicle having already possessed the required practically usable and individually compensated positional data without, however, discontinuing the production lines even if any trouble appears on any one of the practically working automatic guided vehicles, whereby the productivity is improved.

It is preferable that, for obtaining the positional-compensating data by use of the single unpractical station, each of the individual automatic guided vehicles, except for the original one, receives the common practical-positional data which were already obtained by the original teaching operations by use of not only the practical station but also the unpractical reference station. The robot arm of the each of the individual automatic guided vehicles, except for the original one, is enabled to conduct provisionally loading and unloading operations by use of only the unpractical single station on the basis of the received common practical-positional data relating to the unpractical reference station. As a result, if an instrumental error of the presently teaching one of the automatic guided vehicle having the robot arm is different from the instrumental error of the original one of the automatic guided vehicles, then there appears a displacement of the hand of the robot arm from the predetermined reference positions over the unpractical reference station, wherein the displacement corresponds to the difference in instrumental error between the presently teaching one and the original one. In this case, the displaced position of the hand of the robot arm from the predetermined reference position is manually corrected for obtaining the exact correspondence between the corrected position of the hand and the predetermined reference position. This manually position-correcting operation provides displacement-correcting informations about how many distance was displaced and should be corrected. This displacement-correcting informations provide the position-compensating data which are to be used for individually compensating all of the common practical-positional data relating to the practical stations except for relating to the unpractical reference station, in order to obtain the practically usable and individually compensated positional data which are usable for only the presently teaching one of the automatic guided vehicles in front of the practical stations for practically loading and unloading the article onto and from the practical stations at the exactly accurate positioning of the hand of the robot arm.

It is further preferable that the unpractical operation is of loading and unloading the article onto and from at least a frame member located on an upper surface of the single unpractical reference station at a corresponding position to a practical placing position of the practical station where the article should be placed in practical loading and unloading operations.

It is further more preferable that the article is loaded and unloaded by the robot arm onto and from each of a plurality of the frame member provided on the upper surface of the single unpractical reference station at respectively corresponding positions to practical placing positions of plural kinds of the practical station, for example, a first kind of station possessed by a manufacturing equipment and a second king of station possessed by an automatic stack. The first kind of station possessed by the manufacturing equipment may be classified into a first loading-purpose station for loading the article from the automatic guided vehicle onto the first loading-purpose station, a first unloading purpose station for unloading the article from the first unloading-purpose station onto the automatic guided vehicle, and a first loading/unloading general purpose station for loading and unloading the article between the first unloading-purpose station and the automatic guided vehicle.

It is moreover preferable that a wafer carrier for carrying semiconductor wafers is loaded and unloaded as the article by the robot arm.

The second position invention provides a method of compensating individual instrument errors possessed by a plurality of automatic guided vehicles, each of which is provided with at least a robot arm for loading and unloading an article. The method comprises the single step of: teaching each of the automatic guided vehicles about individual positional-compensating data by use of a single unpractical reference station so as to individually compensate commonly supplied practical-positional data of at least a practical station with the individual positional-compensating data for compensation to the individual instrumental errors of the automatic guided vehicles, wherein the positional-compensating data are concerned with a difference between individuals of the automatic guided vehicles in a relative-position between a hand of the robot arm and a reference point on the automatic guided vehicle to be referred for stopping the automatic guided vehicle at a predetermined stop position.

In accordance with the second present invention, the robot arm of the original one of the automatic guided vehicles enables to perform at least any one of loading and unloading operations on the basis of the practical-positional data obtained by original teaching operation by use of the practical stations. The robot arm of the each of the automatic guided vehicles except for the original one enables to perform at least any one of the loading and unloading operations on the basis of the individual positional-compensating data. It is necessary to teach but only the original one of the automatic guided vehicles about the practical-positional data belonging to the practical stations by use of the practical stations. It is, however, unnecessary to teach the remainders of the automatic guided vehicles about the practical-positional data belonging to the practical stations by use of the practical stations, whereby there can be shortened the necessary time for teaching all of the automatic guided vehicles. The above present invention is to teach all of the automatic guided vehicles about practically usable and individually compensated positional data which were individually compensated with the above positional-compensating data obtained by teaching by use of the single unpractical reference station, resulting in the exact compensation to individual instrumental errors of the automatic guided vehicles, thereby permitting the exactly accurate loading and unloading operations of the robot arms of everyone of the automatic guided vehicles. The above instrumental errors are necessarily and unavoidably caused in assembling the individual automatic guided vehicles. In accordance with the present invention, however, it is possible to teach all of the automatic guided vehicles about practically usable and individually compensated positional data which were individually compensated with the above positional-compensating data obtained by reference-teaching operation by use of the single unpractical reference station for the purpose of the exact compensation to the individual instrumental errors of the automatic guided vehicles, thereby permitting the robot arms of everyone of the automatic guided vehicles to exhibit the exactly accurate loading and unloading operations.

Further, the above teaching to all of the automatic guided vehicles, except the original one, about the positional-compensating data for compensation to the previously supplied common practical positional data to obtain the required practically usable and individually compensated positional data is carried out on the unpractical orbit by use of the single unpractical reference station along the unpractical orbit whilst the practically working automatic guided vehicles are continued on the practical orbit for practically loading and unloading the articles onto and from the practical stations. The above reference-teaching to obtain the required practically usable and individually compensated positional data already compensated with the positional-compensating data has been carried out, before the automatic guided vehicles possessing the required practically usable individually compensated positional data are placed on the unpractical orbit in the stand-by state to wait for a possible future calling to enter into the practical orbit. If any trouble appears on any one of the practically working automatic guided vehicles, then the stand-by automatic guided vehicle possessing the required practically usable and individually compensated positional data enters into the practical orbit for practical working for loading and unloading the article onto and from the practical stations in place of the troubled one of the practically working automatic guided vehicles. The troubled one of the practically working automatic guided vehicles is thus retired from the practical orbit to hand over the practical loading and unloading works to the newly entered automatic guided vehicle having already possessed the required practically usable and individually compensated positional data without, however, discontinuing the production lines even if any trouble appears on any one of the practically working automatic guided vehicles, whereby the productivity is improved.

It is preferable that, for obtaining the positional-compensating data by use of the single unpractical station, each of the individual automatic guided vehicles, except for the original one, receives the common practical-positional data which were already obtained by the original teaching operations by use of not only the practical station but also the unpractical reference station. The robot arm of the each of the individual automatic guided vehicles, except for the original one, is enabled to conduct provisionally loading and unloading operations by use of only the unpractical single station on the basis of the received common practical-positional data relating to the unpractical reference station. As a result, if an instrumental error of the presently teaching one of the automatic guided vehicle having the robot arm is different from the instrumental error of the original one of the automatic guided vehicles, then there appears a displacement of the hand of the robot arm from the predetermined reference positions over the unpractical reference station, wherein the displacement corresponds to the difference in instrumental error between the presently teaching one and the original one. In this case, the displaced position of the hand of the robot arm from the predetermined reference position is manually corrected for obtaining the exact correspondence between the corrected position of the hand and the predetermined reference position. This manually position-correcting operation provides displacement-correcting informations about how many distance was displaced and should be corrected. This displacement-correcting informations provide the position-compensating data which are to be used for individually compensating all of the common practical-positional data relating to the practical stations except for relating to the unpractical reference station, in order to obtain the practically usable and individually compensated positional data which are usable for only the presently teaching one of the automatic guided vehicles in front of the practical stations for practically loading and unloading the article onto and from the practical stations at the exactly accurate positioning of the hand of the robot arm.

It is further preferable that the unpractical operation is of loading and unloading the article onto and from at least a frame member located on an upper surface of the single unpractical reference station at a corresponding position to a practical placing position of the practical station where the article should be placed in practical loading and unloading operations.

it is further more preferable that the article is loaded and unloaded by the robot arm onto and from each of the plurality of the frame member provided on the upper surface of the single unpractical reference station at respectively corresponding positions to practical placing positions of plural kinds of the practical station, for example, a first kind of station possessed by a manufacturing equipment and a second king of station possessed by an automatic stack. The first kind of station possessed by the manufacturing equipment may be classified into a first loading-purpose station of loading the article from the automatic guided vehicle onto the first loading-purpose station, a first unloading purpose station for unloading the article from the first unloading-purpose station onto the automatic guided vehicle, and a first loading/unloading general-purpose station for loading and unloading the article between the first unloading-purpose station and the automatic guided vehicle.

It is moreover preferable that a wafer carrier for carrying semiconductor wafers is loaded and unloaded as the article by the robot arm.

The third present invention provides a method of controlling a plurality of automatic guided vehicles, each of which is provided with at least a robot arm for loading and unloading an article. The method comprises the steps of: teaching each of at least a stand-by one on a stand-by orbit of the automatic guided vehicles about positional-compensating data by use of a single unpractical reference station so as to individually compensate commonly supplied practical-positional data belong to each of plural practical stations with the positional-compensating data to obtain individual compensated positional-data for compensation to the individual instrumental errors of the automatic guided vehicles, so that the robot arms of the automatic guided vehicles are controlled on the basis of the individual compensated positional-data for loading and unloading operations in front of practical stations, wherein the positional-compensating data are concerned with a difference between individuals of the automatic guided vehicles in a relative-position between a hand of the robot arm and a reference point on the automatic guided vehicle to be referred to stopping the automatic guided vehicle at a predetermined stop position.

In accordance with the third present invention, the robot arm of the original one of the automatic guided vehicles enables to perform at least any one of loading and unloading operations on the basis of the practical-positional data obtained by original teaching operation by use of the practical stations. The robot arm of the each of the automatic guided vehicles except for the original one enables to perform at least any one of the loading and unloading operations on the basis of the individual positional-compensating data. It is necessary to teach but only the original one of the automatic guided vehicles about the practical-positional data belonging to the practical stations by use of the practical stations. It is, however, unnecessary to teach the remainders of the automatic guided vehicles about the practical-positional data belonging to the practical stations by use of the practical stations, whereby there can be shortened the necessary time for teaching all of the automatic guided vehicles. The above present invention is to teach all of the automatic guided vehicles about practically usable and individually compensated positional data which were individually compensated with the above positional-compensating data obtained by teaching by use of the single unpractical reference station, resulting in the exact compensation to individual instrumental errors of the automatic guided vehicles, thereby permitting the exactly accurate loading and unloading operations of the robot arms of everyone of the automatic guided vehicles. The above instrumental errors are necessarily and unavoidable caused in assembling the individual automatic guided vehicles. In accordance with the present invention, however, it is possible to teach all of the automatic guided vehicles about practically usable and individually compensated positional data which were individually compensated with the above positional-compensating data obtained by reference-teaching operation by use of the single unpractical reference station for the purpose of the exact compensation to the individual instrumental errors of the automatic guided vehicles, thereby permitting the robot arms of everyone of the automatic guided vehicles to exhibit the exactly accurate loading and unloading operations.

Further, the above teaching to all of the automatic guided vehicles, except of the original one, about the positional-compensating data for compensation to the previously supplied common practical positional data to obtain the required practically usable and individually compensated positional data is carried out on the unpractical orbit by use of the single unpractical reference station along the unpractical orbit whilst the practical working automatic guided vehicles are continued on the practical orbit for practically loading and unloading the articles onto and from the practical stations. The above reference-teaching to obtain the required practically usable and individually compensated positional data already compensated with the positional-compensating data has been carried out, before the automatic guided vehicles possessing the required practically usable and individually compensated positional data are placed on the unpractical orbit in the stand-by state to wait for a possible future calling to enter into the practical orbit. If any trouble appears on any one of the practically working automatic guided vehicles, then the stand-by automatic guided vehicle possessing the required practically usable and individually compensated positional data enters into the practical orbit for practical working for loading and unloading the article onto and from the practical stations in place of the troubled one of the practically working automatic guided vehicles. The troubled one of the practically working automatic guided vehicles is thus retired from the practical orbit to hand over the practical loading and unloading works to the newly entered automatic guided vehicle having already possessed the required practically usable and individually compensated positional data without, however, discontinuing the production lines even if any trouble appears on any one of the practically working automatic guided vehicles, whereby the productivity is improved.

If is preferable that, for obtaining the positional-compensating data by use of the single unpractical station, each of the individual automatic guided vehicles except for the original one, receives the common practical-positional data which were already obtained by the original teaching operations by use of not only the practical station but also the unpractical reference station. The robot arm of the each of the individual automatic guided vehicles, except for the original one, is enabled to conduct provisionally loading and unloading operations by use of only the unpractical single station on the basis of the received common practical-positional data relating to the unpractical reference station. As a result, if an instrumental error of the presently teaching one of the automatic guided vehicle having the robot arm is different from the instrumental error of the original one of the automatic guided vehicles, then there appears a displacement of the hand of the robot arm from the predetermined reference positions over the unpractical reference station, wherein the displacement corresponds to the difference in instrumental error between the presently teaching one and the original one. In this case, the displaced position of the hand of the robot arm from the predetermined reference position is manually corrected for obtaining the exact correspondence between the corrected position of the hand and the predetermined reference position. This manually position-correcting operation provides displacement-correcting informations about how many distance was displaced and should be corrected. This displacement-correcting informations provide the position-compensating data which are to be used for individually compensating all of the common practical-positional data relating to the practical stations except for relating to the unpractical reference station, in order to obtain the practically usable and individually compensated positional data which are usable for only the presently teaching one of the automatic guided vehicles in front of the practical stations for practically loading and unloading the article onto and from the practical stations at the exactly accurate positioning of the hand of the robot arm.

It is further preferable that the unpractical operation is of loading and unloading the article onto and from at least a frame member located on an upper surface of the single unpractical reference station at a corresponding position to a practical placing position of the practical station where the article should be placed in practical loading and unloading operations.

It is further more preferable that the article is loaded and unloaded by the robot arm onto and from each of a plurality of the frame member provided on the upper surface of the single unpractical reference station at respectively corresponding positions to practical placing positions of plural kinds of the practical station, for example, a first kind of station possessed by a manufacturing equipment and a second king of station possessed by an automatic stack. The first kind of station possessed by the manufacturing equipment may be classified into a first loading-purpose station for loading the article from the automatic guided vehicle onto the first loading-purpose station, a first unloading purpose station for unloading the article from the first unloading-purpose station onto the automatic guided vehicle, and a first loading/unloading general-purpose station for loading and unloading the article between the first unloading-purpose station and the automatic guided vehicle.

It is moreover preferable that a wafer carrier for carrying semiconductor wafers is loaded and unloaded as the article by the robot arm.

The fourth present invention provides a system for teaching a plurality of automatic guided vehicles, each of which is provided with at least a robot arm for loading and unloading an article onto and from at least a practical station. The system comprises an information storage device for storing common data information obtained by teaching only an original one of the automatic guided vehicles about practical-positional data belonging to at least a practical station by use of the at least practical station; an information supplying device for supplying all of the automatic guided vehicles, except for the original one, with the common data informations about the practical-positional data; a teaching-purpose reference device for teaching everyone of the automatic guided vehicles about individual reference-positional data to obtain individual positional-compensating data, so as to individually compensate the practical-positional data as common data with the individual positional-compensating data for compensation to individual instrumental errors of the automatic guided vehicles. The positional-compensating data are concerned with a difference of the automatic guided vehicles, except for the original one, from the original one in a relative-position between a hand of the robot arm and a reference point on the automatic guided vehicle to be referred to stopping the automatic guided vehicle at a predetermined stop position in front of the at least practical station.

In accordance with the fourth present invention, the robot arm of the original one of the automatic guided vehicles enables to perform at least any one of loading and unloading operations on the basis of the practical-positional data obtained by original teaching operation by use of the practical stations. The robot arm of the each of the automatic guided vehicles except for the original one enables to perform at least any one of the loading and unloading operations on the basis of the individual positional-compensating data. It is necessary to teach but only the original one of the automatic guided vehicles about the practical-positional data belonging to the practical stations by use of the practical stations. It is, however, unnecessary to teach the remainders of the automatic guided vehicles about the practical-positional data belonging to the practical stations by use of the practical stations, whereby there can be shortened the necessary time for teaching all of the automatic guided vehicles. The above present invention is to teach all of the automatic guided vehicles about practically usable and individually compensated positional data which were individually compensated with the above positional-compensating data obtained by teaching by use of the single unpractical reference station, resulting in the exact compensation to individual instrumental errors of the automatic guided vehicles, thereby permitting the exactly accurate loading and unloading operations of the robot arms of everyone of the automatic guided vehicles. The above instrumental errors are necessarily and unavoidably caused in assembling the individual automatic guided vehicles. In accordance with the present invention, however, it is possible to teach all of the automatic guided vehicles about practically usable and individually compensated positional data which were individually compensated with the above positional-compensating data obtained by reference-teaching operation by use of the single unpractical reference station for the purpose of the exact compensation to the individual instrumental errors of the automatic guided vehicles, thereby permitting the robot arms of everyone of the automatic guided vehicles to exhibit the exactly accurate loading and unloading operations.

Further, the above teaching to all of the automatic guided vehicles, except for the original one, about the positional-compensating data for compensation to the previously supplied common practical positional data to obtain the required practically usable and individually compensated positional data is carried out on the unpractical orbit by use of the single unpractical reference station along the unpractical orbit whilst the practically working automatic guided vehicles are continued on the practical orbit for practically loading and unloading the articles onto and from the practical stations. The above reference-teaching to obtain the required practically usable and individually compensated positional data already compensated with the positional-compensating data has been carried out, before the automatic guided vehicles possessing the required practically usable and individually compensated positional data are placed on the unpractical orbit in the stand-by state to wait for a possible future calling to enter into the practical orbit. If any trouble appears on any one of the practically working automatic guided vehicles, then the stand-by automatic guided vehicle possessing the required practically usable and individually compensated positional data enters into the practical orbit for practical working for loading and unloading the article onto and from the practical stations in place of the troubled one of the practically working automatic guided vehicles. The troubled one of the practically working automatic guided vehicles is thus retired from the practical orbit to hand over the practical loading and unloading works to the newly entered automatic guided vehicle having already possessed the required practically usable and individually compensated positional data without, however, discontinuing the production lines even if any trouble appears on any one of the practically working automatic guided vehicles, whereby the productivity is improved.

It is preferable that, for obtaining the positional-compensating data by use of the single unpractical station, each of the individual automatic guided vehicles, except for the original one, receives the common practical-positional data which were already obtained by the original teaching operations by use of not only the practical station but also the unpractical reference station. The robot arm of the each of the individual guided vehicles, except for the original one, is enabled to conduct provisionally loading and unloading operations by use of only the unpractical single station on the basis of the received common practical-positional data relating to the unpractical reference station. As a result, if an instrumental error of the presently teaching one of the automatic guided vehicle having the robot arm is different from the instrumental error of the original one of the automatic guided vehicles, then there appears a displacement of the hand of the robot arm from the predetermined reference positions over the unpractical reference station, wherein the displacement corresponds to the difference in instrumental error between the presently teaching one and the original one. In this case, the displaced position of the hand of the robot arm from the predetermined reference position is manually corrected for obtaining the exact correspondence between the corrected position of the hand and the predetermined reference position. This manually position-correcting operation provides displacement-correcting informations about how many distance was displaced and should be corrected. This displacement-correcting informations provide the position-compensating data which are to be used for individually compensating all of the common practical-positional data relating to the practical stations except for relating to the unpractical reference station, in order to obtain the practically usable and individually compensated positional data which are usable for only the presently teaching one of the automatic guided vehicles in front of the practical stations for practically loading and unloading the article onto and from the practical stations at the exactly accurate positioning of the hand of the robot arm.

It is further preferable that the single unpractical reference station has an upper surface on which at least a frame member is located at a corresponding position to a practical placing position of the practical station where the article should be placed in practical loading and unloading operations.

it is further more preferable that a plurality of the frame member is provided on the upper surface of the single unpractical reference station at respectively corresponding positions to practical placing positions of plural kinds of the practical station, for example, a first kind of station possessed by a manufacturing equipment and a second king of station possessed by an automatic stack. The first kind of station possessed by the manufacturing equipment may be classified into a first loading-purpose station for loading the article from the automatic guided vehicle onto the first loading-purpose station, a first unloading purpose station for unloading the article from the first unloading-purpose station onto the automatic guided vehicle, and a first loading/unloading general-purpose station for loading and unloading the article between the first unloading-purpose station and the automatic guided vehicle.

It is moreover preferable that the robot arm is operated to load and unload a wafer carrier for carrying semiconductor wafers as the article.

The fifth present invention provides an apparatus for compensating individual instrument errors possessed by a plurality of automatic guided vehicles, each of which is provided with at least a robot arm for loading and unloading an article. The apparatus comprises: a single unpractical reference station placed on an unpractical orbit different from a practical orbit on which the automatic guided vehicles perform practical loading and unloading operations, and the single unpractical reference station being for teaching each of the automatic guided vehicles about individual positional-compensating data, so as to individually compensate commonly supplied practical-positional data of at least a practical station with the individual positional-compensating data for compensation to the individual instrumental errors of the automatic guided vehicles, wherein the positional-compensating data are concerned with a difference between individuals of the automatic guided vehicles in a relative-position between a hand of the robot arm and a reference point on the automatic guided vehicle to be referred for stopping the automatic guided vehicle at a predetermined stop position.

In accordance with the fifth present invention, the robot arm of the original one of the automatic guided vehicles enables to perform at least any one of loading and unloading operations on the basis of the practical-positional data obtained by original teaching operation by use of the practical stations. The robot arm of the each of the automatic guided vehicles except for the original one enables to perform at least any one of the loading and unloading operations on the basis of the individual positional-compensating data. It is necessary to teach but only the original one of the automatic guided vehicles about the practical-positional data belonging to the practical stations by use of the practical stations. It is, however, unnecessary to teach the remainders of the automatic guided vehicles about the practical-positional data belonging to the practical stations by use of the practical stations, whereby there can be shortened the necessary time for teaching all of the automatic guided vehicles. The above present invention is to teach all of the automatic guided vehicles about practically usable and individually compensated positional data which were individually compensated with the above positional-compensating data obtained by teaching by use of the single unpractical reference station, resulting in the exact compensation to individual instrumental errors of the automatic guided vehicles, thereby permitting the exactly accurate loading and unloading operations of the robot arms of everyone of the automatic guided vehicles. The above instrumental errors are necessarily and unavoidable caused in assembling the individual automatic guided vehicles. In accordance with the present invention, however, it is possible to teach all of the automatic guided vehicles about practically usable and individually compensated positional data which were individually compensated with the above positional-compensating data obtained by reference-teaching operation by use of the single unpractical reference station for the purpose of the exact compensation to the individual instrumental errors of the automatic guided vehicles, thereby permitting the robot arms of everyone of the automatic guided vehicles to exhibit the exactly accurate loading and unloading operations.

Further, the above teaching to all of the automatic guided vehicles, except for the original one, about the positional-compensating data for compensation to the previously supplied common practical positional data to obtain the required practically usable and individually compensated positional data is carried out on the unpractical orbit by use of the single unpractical reference station along the unpractical orbit whilst the practically working automatic guided vehicles are continued on the practical orbit for practically loading and unloading the articles onto and from the practical stations. The above reference-teaching to obtain the required practically usable and individually compensated positional data already compensated with the positional-compensating data has been carried out, before the automatic guided vehicles possessing the required practically usable and individually compensated positional data are placed on the unpractical orbit in the stand-by state to wait for a possible future calling to enter into the practical orbit. If any trouble appears on any one of the practically working automatic guided vehicles, then the stand-by automatic guided vehicle possessing the required practically usable and individually compensated positional data enters into the practical orbit for practical working for loading and unloading the article onto and from the practical stations in place of the troubled one of the practically working automatic guided vehicles. The troubled one of the practically working automatic guided vehicles is thus retired from the practical orbit to hand over the practical loading and unloading works to the newly entered automatic guided vehicle having already possessed the required practically usable and individually compensated positional data without, however, discontinuing the production lines even if any trouble appears on any one of the practically working automatic guided vehicles, whereby the productivity is improved.

It is preferable that, for obtaining the positional-compensating data by use of the single unpractical station, each of the individual automatic guided vehicles, except for the original one, receives the common practical-positional data which were already obtained by the original teaching operations by use of not only the practical station but also the unpractical reference station. The robot arm of the each of the individual automatic guided vehicles, except for the original one, is enabled to conduct provisionally loading and unloading operations by use of only the unpractical single station on the basis of the received common practical-positional data relating to the unpractical reference station. As a result, if an instrumental error of the presently teaching one of the automatic guided vehicle having the robot arm is different from the instrumental error of the original one of the automatic guided vehicles, then there appears a displacement of the hand of the robot arm from the predetermined reference positions over the unpractical reference station, wherein the displacement corresponds to the difference in instrumental error between the presently teaching one and the original one. In the case, the displaced position of the hand of the robot arm from the predetermined reference position is manually corrected for obtaining the exact corresponding between the correction position of the hand and the predetermined reference position. This manually position-correcting operation provides displacement-correcting informations about how many distance was displaced and should be corrected. This displacement-correcting informations provide the position-compensating data which are to be used for individually compensating all of the common practical-positional data relating to the practical stations except for relating to the unpractical reference station, in order to obtain the practically usable and individually compensated positional data which are usable for only the presently teaching one of the automatic guided vehicles in front of the practical stations of practically loading and unloading the article onto and from the practical stations at the exactly accurate positioning of the hand of the robot arm.

It is further preferable that the single unpractical reference station has an upper surface on which at least a frame member is located at a corresponding position to a practical placing position of the practical station where the article should be placed in practical loading and unloading operations.

It is further more preferable that a plurality of the frame member is provided on the upper surface of the single unpractical reference station at respectively corresponding positions to practical placing positions of plural kinds of the practical station, for example, a first kind of station possessed by a manufacturing equipment and a second king of station possessed by an automatic stack. The first kind of station possessed by the manufacturing equipment may be classified into a first loading-purpose station for loading the article from the automatic guided vehicle onto the first loading-purpose station, a first unloading purpose station for unloading the article from the first unloading-purpose station onto the automatic guided vehicle, and a first loading/unloading general purpose station for loading and unloading the article between the first unloading-purpose station and the automatic guided vehicle.

It is moreover preferable that the robot arm is operated to load an unload a wafer carrier for carrying semiconductor wafers as the article.

The sixth present invention provides a system for controlling a plurality of automatic guided vehicles, each of which is provided with at least a robot arm for loading and unloading an article. The system comprises: a single unpractical reference station for teaching each of at least a stand-by one on a stand-by orbit of the automatic guided vehicles about positional-compensating data so as to individually compensate commonly supplied practical-positional data belonging to each of plural practical stations with the positional-compensating data to obtain individual compensated positional-data for compensation to the individual instrumental errors of the automatic guided vehicles; and a controller for controlling the robot arms of the automatic guided vehicles on the basis of the individual compensated positional-data for loading and unloading operations in front of practical stations, wherein the positional-compensating data are concerned with a difference between individuals of the automatic guided vehicles in a relative-position between a hand of the robot arm and a reference point on the automatic guided vehicle to be referred to stopping the automatic guided vehicle at a predetermined stop position.

In accordance with the sixth present invention, the robot arm of the original one of the automatic guided vehicles enables to perform at least any one of loading and unloading operations on the basis of the practical-positional data obtained by original teaching operation by use of the practical stations. The robot arm of the each of the automatic guided vehicles except for the original enables to perform at least any one of the loading and unloading operations on the basis of the individual positional-compensating data. It is necessary to teach but only the original one of the automatic guided vehicles about the practical-positional data belonging to the practical stations by use of the practical stations. It is, however, unnecessary to teach the remainders of the automatic guided vehicles about the practical-positional data belonging to the practical stations by use of the practical stations, whereby there can be shortened the necessary time for teaching all of the automatic guided vehicles. The above present invention is to teach all of the automatic guided vehicles about practically usable and individually compensated positional data which were individually compensated with the above positional-compensating data obtained by teaching by use of the single unpractical reference station, resulting in the exact compensation to individual instrumental errors of the automatic guided vehicles, thereby permitting the exactly accurate loading and unloading operations of the robot arms of everyone of the automatic guided vehicles. The above instrumental errors are necessarily and unavoidable caused in assembling the individual automatic guided vehicles. In accordance with the present invention, however, it is possible to teach all of the automatic guided vehicles about practically usable and individually compensated positional data which were individually compensated with the above positional-compensating data obtained by reference-teaching operation by use of the single unpractical reference station for the purpose of the exact compensation to the individual instrumental errors of the automatic guided vehicles, thereby permitting the robot arms of everyone of the automatic guided vehicles to exhibit the exactly accurate loading and unloading operations.

Further, the above teaching to all of the automatic guided vehicles, except for the original one, about the positional-compensating data for compensation to the previously supplied common practical positional data to obtain the required practically usable and individually compensated positional data is carried out on the unpractical orbit by use of the single unpractical reference station along the unpractical orbit whilst the practically working automatic guided vehicles are continued on the practical orbit for practically loading and unloading the articles onto and from the practical stations. The above reference-teaching to obtain the required practically usable and individually compensated positional data already compensated with the positional-compensating data has been carried out, before the automatic guided vehicles possessing the required practically usable and individually compensated positional data are placed on the unpractical orbit in the stand-by state to wait for a possible future calling to enter into the practical orbit. If any trouble appears on any one of the practically working automatic guided vehicles, then the stand-by automatic guided vehicle possessing the required practically usable and individually compensated positional data enters into the practical orbit for practical working for loading and unloading the article onto and from the practical stations in place of the troubled one of the practically working automatic guided vehicles. The troubled one of the practically working automatic guided vehicles is thus retired from the practical orbit to hand over the practical loading and unloading works to the newly entered automatic guided vehicle having already possessed the required practically usable and individually compensated positional data without, however, discontinuing the production lines even if any trouble appears on any one of the practically working automatic guided vehicles, whereby the productivity is improved.

It is preferable that, for obtaining the positional-compensating data by use of the single unpractical station, each of the individual automatic guided vehicles, except for the original one, receives the common practical-positional data which were already obtained by the original teaching operations by use of not only the practical station but also the unpractical reference station. The robot arm of the each of the individual automatic guided vehicles, except for the original one, is enabled to conduct provisionally loading and unloading operations by use of only the unpractical single station on the basis of the received common practical-positional data relating to the unpractical reference station. As a result, if an instrumental error of the presently teaching one of the automatic guided vehicle having the robot arm is different from the instrumental error of the original one of the automatic guided vehicles, then there appears a displacement of the hand of the robot arm from the predetermined reference position over the unpractical reference station, wherein the displacement corresponds to the difference in instrumental error between the presently teaching one and the original one. In this case, the displaced position of the hand of the robot arm from the predetermined reference position is manually corrected for obtaining the exact correspondence between the corrected position of the hand and the predetermined reference position. This manually position-correcting operation provides displacement-correcting informations about how many distance was displaced and should be corrected. The displacement-correcting informations provide the position-compensating data which are to be used for individually compensating all of the common practical-positional data relating to the practical stations except for relating to the unpractical reference station, in order to obtain the practically usable and individually compensated positional data which are usable for only the presently teaching one of the automatic guided vehicles in front of the practical stations for practically loading and unloading the article onto and from the practical stations at the exactly accurate positioning of the hand of the robot arm.

It is further preferable that the single unpractical reference station has an upper surface on which at least a frame member is located at a corresponding position to a practical placing position of the practical station while the article should be placed in practical loading and unloading operations.

It is further more preferable that a plurality of the frame member is provided on the upper surface of the single unpractical reference station at respectively corresponding positions to practical placing positions of plural kinds of the practical station, for example, a first kind of station possessed by a manufacturing equipment and a second king of station possessed by an automatic stack. The first kind of station possessed by the manufacturing equipment may be classified into a first loading-purpose station for loading the article from the automatic guided vehicle onto the first loading-purpose station, a first unloading purpose station for unloading the article from the first unloading-purpose station onto the automatic guided vehicle, and a first loading/unloading general-purpose station for loading and unloading the article between the first unloading-purpose station and the automatic guided vehicle.

It is moveover preferable that the robot arm is operated to load and unload a wafer carrier for carrying semiconductor wafers as the article.

PREFERRED EMBODIMENTS

Figure 2:
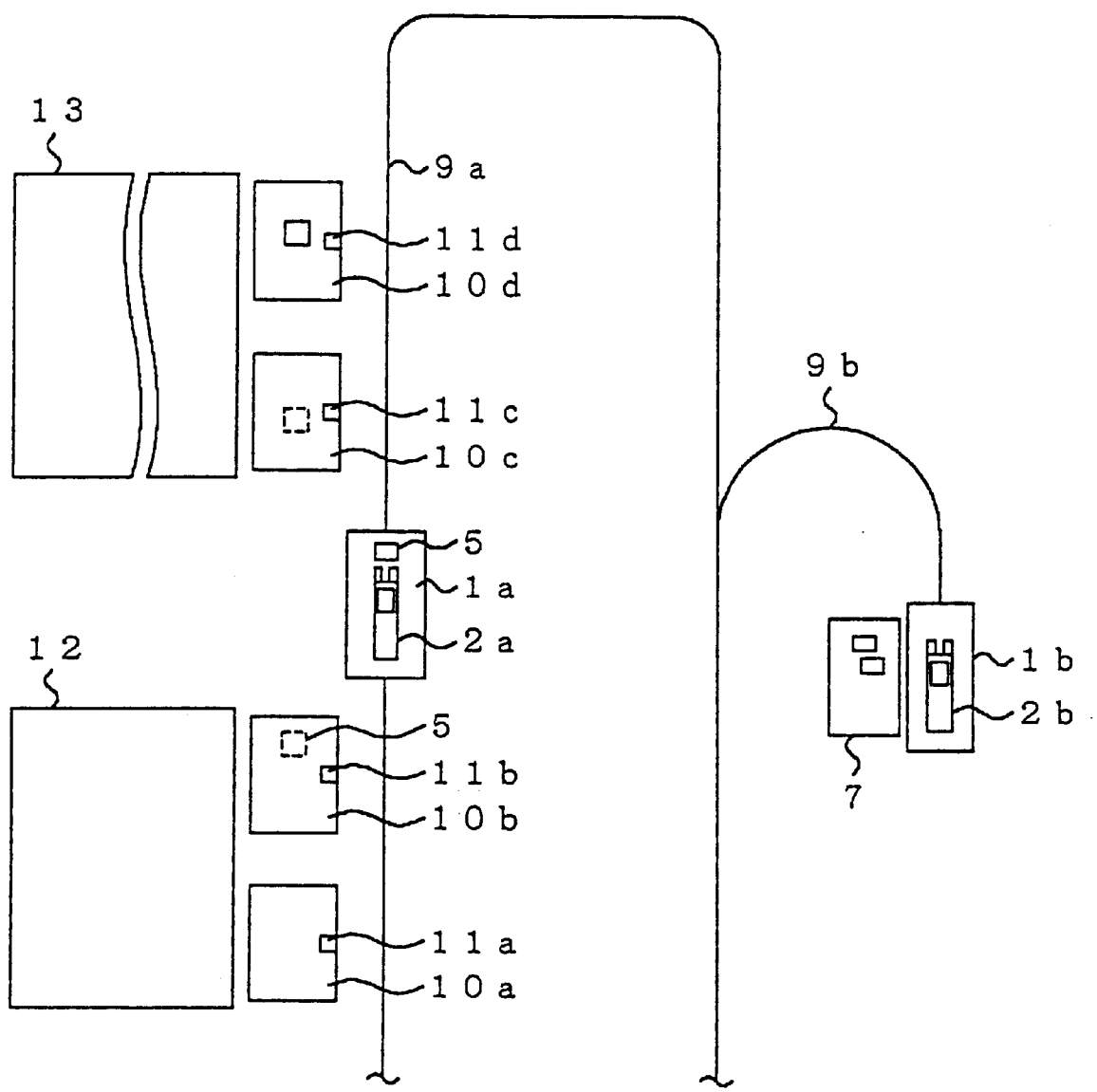
FIG. 2 is a view illustrative of layout of the novel production line of FIG. 1.

First Embodiment:

A first embodiment according to the present invention will be described in detail with references to FIGS. 1 and 2. FIG. 1 is a schematic perspective view illustrative of a novel production line on which automatic guided vehicles with robot arms are operated to load and unload wafer carriers onto and from stations of both a manufacturing equipment and an automatic stack as well as a single reference station for teaching a stand-by automatic guided vehicle about individually compensated positional-data. FIG. 2 is a view illustrative of layout of the novel production line of FIG. 1.

The novel production line has a practical orbit 9a and an unpractical orbit 9b. A practically working automatic guided vehicle 1a travels in accordance with the previously set software program along the practical orbit 9a for stopping in from of practical stations 10a, 10b, 10c and 10d and subsequent its practical working of loading and unloading a wafer carrier 5 onto and from the practical stations 10a, 10b, 10c and 10d. The first robot arm 2a of the practically working automatic guided vehicle 1a has a top portion which has a first charge-coupled device camera 4a for recognizing the first, second, third and fourth positional-reference marks 11a, 11b, 11c and 11d. The first loading-purpose station 10a has a first reference mark 11a which provides a positional reference for confirming a stop-position where the practical working automatic guided vehicle 1a should be stopped in front of the first loading-purpose station 10a for its practical operations of loading a wafer carrier 5 onto the first loading-purpose station 10a. When the practical working automatic guided vehicle 1a is stopped in front of the first loading-purpose station 10a, then the first charge-coupled device camera 4a recognizes both the first reference mark 11a so as to confirm a displacement of the practical working automatic guided vehicle 1a from the stop-position previously determined by the computer software program, so that the displacement is informed to the host computer, whereby the host computer sends the practical working automatic guided vehicle 1a an instruction to move the practical working automatic guided vehicle 1a for compensation to the displacement, resulting in that the practical working automatic guided vehicle 1a is positioned in correspondence with the stop-position for enabling the practical working automatic guided vehicle 1a to perform operation of loading the carrier wafer onto the first loading-purpose station 10a. The second unloading-purpose station 10b has a second reference mark 11b which provides a positional reference for confirming a stop-position where the practical working automatic guided vehicle 1a should be stopped in front of the second unloading-purpose station 10b for its practical operations of unloading the wafer carrier 5 onto the second unloading-purpose station 10b. When the practical working automatic guided vehicle 1a is stopped in front of the second loading-purpose station 10b, then the first charge-coupled device camera 4a recognizes both the second reference mark 11b so as to confirm a displacement of the practical working automatic guided vehicle 1a from the stop-position previously determined by the computer software program, so that the displacement is informed to the host computer, whereby the host computer sends the practical working automatic guided vehicle 1a an instruction to move the practical working automatic guided vehicle 1a for compensation to the displacement, resulting in that the practical working automatic guided vehicle 1a is positioned in correspondence with the stop-position for enabling the practical working automatic guided vehicle 1a to perform operation of loading the carrier wafer onto the second unloading-purpose station 10b. The third loading/unloading-purpose station 10c has a third reference mark 11c which provides a positional reference for confirming a stop-position where the practical working automatic guided vehicle 1a should be stopped in front of the third loading/unloading-purpose station 10c for its practical operations of loading the wafer carrier 5 onto the third loading/unloading-purpose station 10c. When the practical working automatic guided vehicle 1a is stopped in front of the third loading/unloading-purpose station 10c, then the first charge-coupled device camera 4a recognizes both the third reference mark 11c so as to confirm a displacement of the practical working automatic guided vehicle 1a from the stop-position previously determined by the computer software program, so that the displacement is informed to the host computer, whereby the host computer sends the practical working automatic guided vehicle 1a an instruction to move the practical working automatic guided vehicle 1a for compensation to the displacement, resulting in that the practical working automatic guided vehicle 1a is positioned in correspondence with the stop-position for enabling the practical working automatic guided vehicle 1a to perform operation of loading the carrier wafer onto the third loading/unloading-purpose station 10c. The fourth loading/unloading-purpose station 10d has a fourth reference mark 11d which provides a positional reference for confirming a stop-position where the practical working automatic guided vehicle 1a should be stopped in front of the fourth loading/unloading-purpose station 10d for its practical operations of loading the wafer carrier 5 onto the fourth loading/unloading-purpose station 10d. When the practical working automatic guided vehicle 1a is stopped in front of the fourth loading/unloading-purpose station 10d, then the first charge-coupled device camera 4a recognizes both the fourth reference mark 11d so as to confirm a displacement of the practical working automatic guided vehicle 1a from the stop-position previously determined by the computer software program, so that the displacement is informed to the host computer, whereby the host computer sends the practical working automatic guided vehicle 1a an instruction to move the practical working automatic guided vehicle 1a for compensation to the displacement, resulting in that the practical working automatic guided vehicle 1a is positioned in correspondence with the stop-position for enabling the practical working automatic guided vehicle 1a to perform operation of loading the carrier wafer onto the fourth loading/unloading-purpose station 10d.

The accuracy of controlling the stop-position of the practical working automatic guided vehicle 1a is, for example, about 10 millimeters. If the displacement of the practical working automatic guided vehicle 1a from the predetermined stop-position is not less than 3 millimeters, then the displacement is informed to the host computer, whereby the host computer sends the practical working automatic guided vehicle 1a an instruction to move the practical working automatic guided vehicle 1a for attempt to compensate the displacement, so that the displacement is reduced down to 3 millimeters. If the displacement is not more than 3 millimeters, then the charge-coupled device camera 4a recognizes the small displacement so that the previously taught positional data are compensated with the recognized small displacement for more accurate operations of the robot arm 2a for loading and unloading the wafer carrier 5.

Meanwhile, a stand-by automatic guided vehicle 1b is placed in front of a single reference station 7 and on the unpractical orbit 9b to wait for future requirement or call to enter into the practical orbit 9a for its practical working of loading and unloading the waver carrier 5 onto and from the practical stations 10a, 10b, 10c and 10d when the practically working automatic guided vehicle 1a has been troubled. The practically working automatic guided vehicle 1a is provided with a first robot arm 2a having a first hand 3a for catching the wafer carrier 5. The stand-by automatic guided vehicle 1b is also provided with a second robot arm 2a having a second hand 3b for catching the wafer carrier 5. A manufacturing equipment 12 has a first loading-purpose station 10a and a second unloading-purpose station 10b, both of which are located along the practical orbit 9a. The first loading-purpose station 10a is to allow the first robot arm 2a of the practically working automatic guided vehicle 1a to perform for loading the wafer carrier 5 from the practically working automatic guided vehicle 1a onto the first loading-purpose station 10a. The second unfolding-purpose station 10b is to allow the first robot arm 2a of the practically working automatic guided vehicle 1a to perform for unloading the wafer carrier 5 from the second loading-purpose station 10b onto the practically working automatic guided vehicle 1b. The automatic stack 13 also has third and fourth loading/unloading-purpose stations 10c and 10d, both of which are located along the practical orbit 9a. The third loading/unloading-purpose station 10c is to allow the first robot arm 2a of the practically working automatic guided vehicle 1a to perform for both loading and unloading the wafer carrier 5 onto and from the third loading/unloading-purpose station 10c. The fourth loading/unloading-purpose station 10d is to allow the first robot arm 2a of the practically working automatic guided vehicle 1a to perform for both loading and unloading the wafer carrier 5 onto and from the fourth loading/unloading-purpose station 10d. The first reference mark 11a provides a positional reference for confirming wafer carrier placing positions, so that the first charge-coupled device camera 4a recognizes both the first reference mark 11a and the wafer carrier placing position on the first loading-purpose station 10a. The second reference mark 11b provides a positional reference for confirming wafer carrier placing positions, so that the first charge-coupled device camera 4a recognizes both the second reference mark 11b and the wafer carrier placing position on the second unloading-purpose station 10b. The third reference mark 11c provides a positional reference for confirming wafer carrier placing positions, so that the first charge-coupled device camera 4a recognizes both the third reference mark 11c and the wafer carrier placing position on the third loading/unloading-purpose station 10c. The fourth reference mark 11d provides a positional reference for confirming wafer carrier placing positions, so that the first charge-coupled device camera 4a recognizes both the fourth reference mark 11d and the wafer carrier placing position on the fourth loading/unloading-purpose station 10d. The stand-by state automatic guided vehicle 1b is stopped on the unpractical orbit 9b in front of the single reference station 7. The single reference station 7 has a top surface having first and second positional reference frames 14a and 14b. The first positional reference frame 14a is positioned in correspondence with the wafer carrier placing position of the first loading and second unloading stations 10a and 10b, whilst the second positional reference frame 14b is positioned in correspondence with the wafer carrier placing position of the third and fourth loading/unloading stations 10c and 10d. The single reference station 7 also has a position-reader 6 for reading digital values of first, second and third resolvers directly coupled with X-axis, Y-axis and Z-axis driving shafts of the robot arm so that read digital data are then stored in a host computer.

However, individual instrumental errors are necessarily and unavoidably caused in assembling the individual automatic guided vehicles, for which reason it is most important how to compensate the individual instrumental errors by the following novel system or method in accordance with he present invention.

The original automatic guided vehicle 1a is a first taught both about reference-positional data by use of the single unpractical reference station 7 and about practical-positional data belonging to the practical stations 10a, 10b, 10c and 10d by use of the practical stations 10a, 10b, 10c and 10d. The stand-by automatic guided vehicle 1b is then supplied with common data identical with the above practical-positional data taught to the original automatic guided vehicle 1a. Further, the stand-by automatic guided vehicle 1b is taught about individual positional-compensating data by use of the single unpractical reference station 7 so as to individually compensate the common data with the individual positional-compensating data for compensation to individual instrumental errors of automatic guided vehicles 1a and 1b, wherein the individual instrumental errors are different from each other between the automatic guided vehicles 1a and 1b. The positional-compensating data are concerned with a difference of the stand-by automatic guided vehicle 1b from the original automatic guided vehicle 1a in a relative-position between the hand 3 of the robot arm 2 and a reference point on the automatic guided vehicle to be referred for stopping the automatic guided vehicle at the predetermined stop position in front of the practical stations.

The above description will more be detailed as follows. For obtaining the positional-compensating data by use of the single unpractical station 7, the stand-by automatic guided vehicle 1b receives the common practical-positional data which were already obtained by the original teaching operations by use of not only the practical stations 10a, 10b, 10c and 10d but also the unpractical reference station 7. The robot arm 2b of the stand-by automatic guided vehicle 1b is enabled to conduct provisionally loading and unloading operations by use of only the unpractical single station 7 on the basis of the received common practical-positional data relating to the unpractical reference station 7, wherein the practical-positional data relating to the unpractical reference station 7 were already obtained by previously teaching the original automatic guided vehicle 1a by use of the single reference station 7. As a result, if an instrumental error of the stand-by automatic guided vehicle 1b is different from the instrumental error of the original automatic guided vehicle 1a, then there appears a displacement of the hand 3 of the robot arm 2 from the predetermined reference positions, for example, the first and second positional reference frames 14a and 14b over the unpractical reference station 7, wherein the displacement corresponds to the difference in instrumental error between the presently teaching stand-by automatic guided vehicle 1b and the original automatic guided vehicle 1a. The displaced position of the hand 3 of the robot arm 2 from the predetermined reference position is manually corrected for obtaining the exact correspondence between the corrected position of the hand 3 and the predetermined reference position.

For example, the robot arm 2b is operated in X-Y directions in accordance with the received common practical-positional data relating to the unpractical reference station 7, wherein the practical-positional data relating to the unpractical reference station 7 were already obtained by previously teaching the original automatic guided vehicle 1a by use of the single reference station 7. By use of the charge-coupled device camera 4b, any displacement in X-Y directions of the hand 3b from the first or second positional reference frame 14a or 14b is confirmed. During the monitoring of the displacement through the charge-coupled device camera 4b, the position in X-Y directions of the hand 3b of the robot arm 2b is manually adjusted so that the displacement becomes zero in X-Y directions and the hand 3b of the robot arm 2b is positioned in exact correspondence with the first or second positional reference frame 14a and 14b but in X-Y direction. The amount of the above manual adjustment in position in X-Y directions of the hand 3b through monitoring by use of the charge-coupled device camera 4b can be measured by use of the position-reader 6 for reading digital value or amount of resolvers, both of which are directly coupled with an X-axis driving shaft and a Y-axis driving shaft respectively. The measured digital value corresponding to the amount of the above manual adjustment in position in X-Y directions of the hand 3b is sent to the host computer for storage thereof. Subsequently, the robot arm 2a is then operated in Z-direction to move the hand 3b down to the top surface of the first or second positional reference frame 14a or 14b in accordance with the received common practical-positional data relating to the unpractical reference station 7, wherein the practical positional data relating to the unpractical reference station 7 were already obtained by previously teaching the original automatic guided vehicle 1a by use of the single reference station 7. By use of the charge-coupled device camera 4b, any displacement in Z-direction of the hand 3b from the top surface of the first or second positional reference frame 14a or 14b is confirmed. During the monitoring of the displacement through the charge-coupled device camera 4b, the position in Z-direction of the hand 3b of the robot arm 2b is manually adjusted so that the displacement becomes zero in Z-direction and the hand 3b of the robot arm 2b is positioned in exact correspondence with the top surface of the first or second positional reference frame 14a and 14b but in Z-direction. The amount of the above manual adjustment in position in Z-direction of the hand 3b through monitoring by use of the charge-coupled device camera 4b can be measured by use of the position-reader 6 for reading digital value or amount of another resolver which is directly coupled with a Z-axis driving shaft. The measured digital value corresponding to the amount of the above manual adjustment in position in Z-direction of the hand 3b is also sent to the host computer for storage thereof.

The above manual and three dimensional position-correcting or adjusting operation provides three-dimensional displacement-correcting or adjusting informations about how many distance was displaced and should be corrected on three dimensional coordinates. This displacement-correcting informations further provide the position-compensating data which are to be used for individually compensating all of the common practical-positional data relating to the practical stations 10a, 10b, 10c and 10d already obtained by the original teaching operation of the original automatic guided vehicle 1a by use of the practical stations 10a, 10b, 10c and 10d. The compensations to the common practical-positional data relating to the practical stations 10a, 10b, 10c and 10d by the above obtained position-compensating data would provide the practically usable and individually compensated positional data which are usable but only for the present teaching stand-by automatic guided vehicle 1b.

It is, therefore, necessary to teach but only the original automatic guided vehicle 1a about the practical-positional data belonging to the practical stations 10a, 10b, 10c and 10d by use of the practical stations 10a, 10b, 10c and 10d. It is, however, unnecessary to teach any other automatic guided vehicles, for example, the stand-by automatic guided vehicle 1b about the practical-positional data belonging to the practical stations 10a, 10b, 10c and 10d by use of the practical stations 10a, 10b, 10c and 10d, whereby there can be shortened the necessary time for teaching all of the automatic guided vehicles. The above present invention is to teach all of the automatic guided vehicles about practically usable and individually compensated positional data which were individually compensated with the above positional-compensating data obtained by the above reference-teaching operation by use of the single unpractical reference station 7, resulting in the exact compensation to individual instrumental errors of the automatic guided vehicles 1, thereby permitting the exactly accurate loading and unloading operations of the robot arm 2 of everyone of the automatic guided vehicles 1. The above instrumental cross are necessarily and unavoidably caused in assembling the individually automatic guided vehicles. In accordance with the present invention, however, it is possible to teach all of the automatic guided vehicles 1 about the practically usable and individually compensated positional data which were individually compensated with the above positional-compensating data obtained by the above reference-teaching operation by use of the single unpractical reference station 7 for the purpose of the exact compensation to the individual instrumental errors of the automatic guided vehicles 1, thereby permitting the robot arm 2 of everyone of the automatic guided vehicles 1 to exhibit the exactly accurate loading and unloading operations.

Further, the above teaching to the stand-by automatic guided vehicle 1b about the positional-compensating data can be carried out, whilst the practically working automatic guided vehicle 1a is continued on the practical orbit to perform practical loading and unloading operations of the articles onto and from the practical stations. The above reference-teaching operation to obtain the required practically usable and individually compensated positional data already compensated with the positional-compensating data has been carried out, before the automatic guided vehicle 1b possessing the required practically usable and individually compensated positional data is placed on the unpractical orbit 9b in the stand-by state to wait for a possible future calling to enter into the practical orbit 9a. If any trouble appears on the practically working automatic guided vehicle 1a, then the stand-by automatic guided vehicle 1b possessing the required practically usable and individually compensated positional data is operated into enter into the practical orbit 9a for practical working for loading and unloading the wafer carrier 5 onto and from the practical stations 10a, 10b, 10c and 10d in place of the troubled original automatic guided vehicle 1a. The troubled automatic guided vehicle 1a is thus retired from the practical orbit 9a to hand over the practical loading and unloading works to the newly entered automatic guided vehicle 1b having already possessed the required practically usable and individually compensated positional data without, however, discontinuing the production line, whereby the productivity is improved.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A method of teaching a plurality of automatic guided vehicles, each of which is provided with at least a robot arm for loading and unloading an article, the method comprising the steps of:

teaching an original one of the automatic guided vehicles both about reference-positional data by use of a single unpractical reference station and about practical-positional data belonging to at least a practical station by use of the at least practical station; and both supplying the automatic guided vehicles, except for the original one, with common data identical with the practical-positional data taught to the original one, and further teaching the automatic guided vehicles, except for the original one, about individual positional-compensating data by use of the single unpractical reference station so as to individually compensate the common data with the individual positional-compensating data for compensation to individual instrumental errors of the automatic guided vehicles, wherein the positional-compensating data are concerned with a difference of each of the at least remaining one from the original one in a relative-position between a hand of the robot arm and a reference point on the automatic guided vehicle to be referred for stopping the automatic guided vehicle at a predetermined stop position in front of the at least practical station.

2. The method as claimed in claim 1, wherein each of said automatic guided vehicles, except for said original one, receives said common practical-positional data, so that said robot arm of said each of said automatic guided vehicles, except for said original one, is enabled to conduct provisionally loading and unloading operations by use of only said unpractical single station on the basis of said common practical-positional data but only relating to said unpractical reference station so as to manually correct a corresponding displacement to said instrumental error of said hand of said robot arm from a predetermined reference position over said unpractical reference station, for the purpose of providing and position-compensating data which are to be used for individually compensating all of the common practical-positional data relating to said practical stations except for relating to said unpractical reference station.

3. The method as claimed in claim 2, wherein the unpractical operation is of loading and unloading the article onto and from at least a frame member located on an upper surface of the single unpractical reference station at a corresponding position to a practical placing position of the practical station where the article should be placed in practical loading and unloading operations.

4. The method as claimed in claim 3, wherein the article is loaded and unloaded by the robot arm onto and from each of a plurality of the frame member provided on the upper surface of the single unpractical reference station at respectively corresponding positions to practical placing positions of plural kinds of the practical station.

5. The method as claimed in claim 1, wherein a wafer carrier for carrying semiconductor wafers is loaded and unloaded as the article by the robot arm.

6. A method of compensating individual instrument errors possessed by a plurality of automatic guided vehicles, each of which is provided with at least a robot arm for loading and unloading an article, the method comprising the single step of:

teaching each of the automatic guided vehicles about individual positional-compensating data by use of a single unpractical reference station so as to individually compensate commonly supplied practical-positional data of at least a practical station with the individual positional-compensating data for compensation to the individual instrumental errors of the automatic guided vehicles, wherein the positional-compensating data are concerned with a difference between individuals of the automatic guided vehicles in a relative-position between a hand of the robot arm and a reference point on the automatic guided vehicle to be referred for stopping the automatic guided vehicle at a predetermined stop position.

7. The method as claimed in claim 6, wherein each of said automatic guided vehicles, except for said original one, received said common practical-positional data, so that said robot arm of said each of said automatic guided vehicles, except for said original one, is enabled to conduct provisionally loading and unloading operations by use of only said unpractical single station on the basis of said common practical-positional data but only relating to said unpractical reference station so as to manually correct a corresponding displacement to said instrumental error of said hand of said robot arm from a predetermined reference position over said unpractical reference station, for the purpose of providing said position-compensating data which are to be used for individually compensating all of the common practical-positional data relating to said practical stations except for relating to said unpractical reference station.

8. The method as claimed in claim 7, wherein the unpractical operation is of loading and unloading the article onto and from at least a frame member located on an upper surface of the single unpractical reference station at a corresponding position to a practical placing position of the practical station where the article should be placed in practical loading and unloading operations.

9. The method as claimed in claim 8, wherein the article is loaded and unloaded by the robot arm onto and from each of a plurality of the frame member provided on the upper surface of the single unpractical reference station at respectively corresponding positions to practical placing positions of plural kinds of the practical station.

10. The method as claimed in claim 6, wherein a wafer carrier for carrying semiconductor wafers is loaded and unloaded as the article by the robot arm.

11. A method of comprising a plurality of automatic guided vehicles, each of which is provided with at least a robot arm for loading and unloading an article, the method of comprising the steps of:

teaching each of at least a stand-by one on a stand-by orbit of the automatic guided vehicles about positional-compensating data by use of a single unpractical reference station so as to individually compensate commonly supplied practical-positional data belonging to each of plural practical stations with the positional-compensating data to obtain individual compensated positional-data for compensation to the individual instrumental errors of the automatic guided vehicles, so that the robot arms of the automatic guided vehicles are controlled on the basis of the individual compensated positional-data for loading and unloading operations in front of practical stations, wherein the positional-compensating data are concerned with a difference between individuals of the automatic guided vehicles in a relative-position between a hand of the robot arm and a reference point on the automatic guided vehicle to be referred for stopping the automatic guided vehicle at a predetermined stop position.

12. The method as claimed in claim 11, wherein each of said automatic guided vehicles, except for said original one, receives said common practical-positional data, so that said robot arm of said each of said automatic guided vehicles, except for said original one, is enabled to conduct provisionally loading and unloading operations by use of only said unpractical single station on the basis of said common practical-positional data but only relating to said unpractical reference station so as to manually correct a corresponding displacement to said instrumental error of said hand of said robot arm from a predetermined reference position over said unpractical reference station, for the purpose of providing said position-compensating data which are to be used for individually compensating all of the common practical-positional data relating to said practical stations except for relating to said unpractical reference station.

13. The method as claimed in claim 12, wherein the unpractical operation is of loading and unloading the article onto and from at least a frame member located on an upper surface of the single unpractical reference station at a corresponding position to a practical placing position of the practical station where the article should be placed in practical loading and unloading operations.

14. The method as claimed in claim 13, wherein the article is loaded and unloaded by the robot arm onto and from each of a plurality of the frame member provided on the upper surface of the single unpractical reference station at respectively corresponding positions to practical placing positions of plural kinds of the practical station.

15. The method as claimed in claim 11, wherein a wafer carrier for carrying semiconductor wafers is loaded and unloaded as the article by the robot arm.

16. A system for teaching a plurality of automatic guided vehicles, each of which is provided with at least a robot arm for loading and unloading an article onto and from at least a practical station, the system comprising:

means for storing common data informations obtained by teaching only an original one of the automatic guided vehicles about practical-positional data belonging to at least a practical station by use of the at least practical station;

means for supplying all of the automatic guided vehicles, except for the original one, with the common data informations about the practical-positional data; and means for teaching everyone of the automatic guided vehicles about individual reference-positional data to obtain individual positional-compensating data, so as to individually compensate the practical-positional data as common data with the individual positional-compensating data for compensation to individual instrumental errors of the automatic guided vehicles, wherein the positional-compensating data are concerned with a difference of the automatic guided vehicles, except for the original one, from the original one in a relative-position between a hand of the robot arm and a reference point on the automatic guided vehicle to be referred for stopping the automatic guided vehicle at a predetermined stop position in front of the at least practical station.

17. The system as claimed in claim 16, wherein the means for teaching everyone of the automatic guided vehicles about the individual reference-positional data comprises a single unpractical reference station, whereby each of said automatic guided vehicles, except for said original one, receives said common practical-positional data, so that said robot arm of said each of said automatic guided vehicles, except for said original one, is enabled to conduct provisionally loading and unloading operations by use of only said unpractical single station on the basis of said common practical-positional data but only relating to said unpractical reference station so as to manually correct a corresponding displacement to said instrumental error of said hand of said robot arm from a predetermined reference position over said unpractical reference station, for the purpose of providing said position-compensating data which are to be used for individually compensating all of the common practical-positional data relating to said practical stations except for relating to said unpractical reference station.

18. The system as claimed in claim 17, wherein the single unpractical reference station has an upper surface on which at least a frame member is located at a corresponding position to a practical placing position of the practical station where the article should be placed in practical loading and unloading operations.

19. The system as claimed in claim 18, wherein a plurality of the frame member is provided on the upper surface of the single unpractical reference station at respectively corresponding positions of practical placing positions of plural kinds of the practical station.

20. The system as claimed in claim 16, wherein the robot arm is operated to load and unload a wafer carrier for carrying semiconductor wafers as the article.

21. An apparatus for compensating individual instrument errors possessed by a plurality of automatic guided vehicles, each of which is provided with at least a robot arm for loading and unloading an article, the apparatus comprising:

a single unpractical reference station placed on an unpractical orbit different from a practical orbit on which the automatic guided vehicles perform practical loading and unloading operations, and the single unpractical reference station being for teaching each of the automatic guided vehicles about individual positional-compensating data, so as to individually compensate commonly supplied practical-positional data of at least a practical station with the individual positional-compensating data for compensation to the individual instrumental errors of the automatic guided vehicles, wherein the positional-compensating data are concerned with a difference between individuals of the automatic guided vehicles in a relative-position between a hand of the robot arm and a reference point on the automatic guided vehicle to be referred for stopping the automatic guided vehicle at a predetermined stop position.

22. The apparatus as claimed in claim 21, wherein each of said automatic guided vehicles, except for said original one, receives said common practical-positional data, so that said robot arm of said each of said automatic guided vehicles, except for said original one, is enabled to conduct provisionally loading and unloading operations by use of only said unpractical single station on the basis of said common practical-positional data but only relating to said unpractical reference station so as to manually correct a corresponding displacement to said instrumental error of said hand of said robot arm from a predetermined reference position over said unpractical reference station, for the purpose of providing said position-compensating data which are to be used for individually compensating all of the common practical-positional data relating to said practical stations except for relating to said unpractical reference station.

23. The apparatus as claimed in claim 22, wherein the single unpractical reference station has an upper surface on which at least a frame member is located at a corresponding position to a practical placing position of the practical station where the article should be placed in practical loading and unloading operations.

24. The apparatus as claimed in claim 23, wherein a plurality of the frame member is provided on the upper surface of the single unpractical reference station at respectively corresponding positions to practical placing positions of plural kinds of the practical station.

25. The apparatus as claimed in claim 21, wherein the robot arm is operated to load and unload a wafer carrier for carrying semiconductor wafers as the article.

26. A system for controlling a plurality of automatic guided vehicles, each of which is provided with at least a robot arm for loading and unloading an article, the system comprising:

a single unpractical reference station for teaching each of at least a stand-by one on a stand-by orbit of the automatic guided vehicles about positional-compensating data so as to individually compensate commonly supplied practical-positional data belonging to each of plural practical stations with the positional-compensating data to obtain individual compensated positional-data for compensation to the individual instrumental errors of the automatic guided vehicles; and a controller for controlling the robot arms of the automatic guided vehicles on the basis of the individual compensated positional-data for loading and unloading operations in front of practical stations, wherein the positional-compensating data are concerned with a difference between individuals of automatic guided vehicles in a relative-position between a hand of the robot arm and a reference point on the automatic guided vehicle to be referred for stopping the automatic guided vehicle at a predetermined stop position.

27. The system as claimed in claim 26, wherein each of said automatic guided vehicles, except for said original one, receives said common practical-positional data, so that said robot arm of said each of said automatic guided vehicles, except for said original one, is enabled to conduct provisionally loading and unloading operations by use of only said unpractical single station on the basis of said common practical-positional data but only relating to said unpractical reference station so as to manually correct a corresponding displacement to said instrumental error of said hand of said robot arm from a predetermined reference position over said unpractical reference station, for the purpose of providing said position-compensating data which are to be used for individually compensating all of the common practical-positional data relating to said practical stations except for relating to said unpractical reference station.

28. The system is claimed in claim 27, wherein the single unpractical reference station has an upper surface on which at least a frame member is located at a corresponding position to a practical placing position of the practical station where the article should be placed in practical loading and unloading operations.

29. The system as claimed in claim 28, wherein a plurality of the frame member is provided on the upper surface of the single unpractical reference station at respectively corresponding positions to practical placing positions of plural kinds of the practical station.

30. The system as claimed in claim 26, wherein the robot arm is operated to load and unload a wafer carrier for carrying semiconductor wafers as the article.

* * * * *